United States Patent [19]
Anderson

[11] 3,914,110
[45] Oct. 21, 1975

[54] ALKYLATION REACTION COOLER

[75] Inventor: Robert F. Anderson, La Grange Park, Ill.

[73] Assignee: Universal Oil Products Company, Des Plaines, Ill.

[22] Filed: Feb. 19, 1974

[21] Appl. No.: 443,940

[52] U.S. Cl............... 23/288 E; 23/288 K; 23/285; 260/683.48
[51] Int. Cl.²...... B01J 1/00; B01J 8/08; C07C 3/54
[58] Field of Search........... 23/288 K, 288 B, 288 E, 23/285; 260/683.48, 683.49, 683.59, 683.61; 261/117

[56] References Cited
UNITED STATES PATENTS

| | | | |
|---|---|---|---|
| 2,751,425 | 6/1956 | Rupp | 261/117 X |
| 3,053,917 | 9/1962 | Bergougnou | 260/683.48 X |
| 3,322,411 | 5/1967 | Moore | 23/285 X |
| 3,435,092 | 3/1969 | Hutson, Jr. et al. | 260/683.48 |
| 3,469,949 | 9/1969 | Borst, Jr. | 23/285 |
| 3,560,587 | 2/1971 | Borst, Jr. | 260/683.48 |

Primary Examiner—Morris O. Wolk
Assistant Examiner—Arnold Turk
Attorney, Agent, or Firm—James R. Hoatson, Jr.; Robert W. Erickson; William H. Page, II

[57] ABSTRACT

An alkylation reaction cooler for contacting acid catalysts with alkylation reactants. A heat exchanger, a plurality of baffles and a plurality of spray nozzle assemblies are disposed within a horizontally positioned, elongated chamber. Acid catalyst flows in serpentine fashion through the chamber and alkylation reactants are sprayed into the catalyst at directions perpendicular to or against the direction of flow of catalyst in the vicinities of the spray nozzle assemblies. The exothermic heat of reaction is removed by the heat exchanger.

4 Claims, 6 Drawing Figures

ALKYLATION REACTION COOLER

BACKGROUND OF THE INVENTION

1. Field of the Invention

The field of art to which this invention pertains is that of hydrocarbon processing. In particular, this invention relates to a reactant contacting apparatus useful for liquid phase alkylation utilizing hydrofluoric acid as the catalyst.

2. Prior Art

World political influences, tending to restrict what has traditionally been unhampered trade in crude petroleum, have caused energy shortages in some nations and, in so doing, have increased the economic importance attached to the efficient use of this energy source. A contribution to more efficient use may be made in the alkylation process by providing higher product quality through an improved reactant contacting apparatus.

The advantage in using nozzles to create fine dispersions of reactant droplets sprayed into a moving catalyst phase is well known in the art. Exemplary of designs of this type are U.S. Pat. Nos. 3,707,580; 3,705,017; 3,758,613; 3,696,168; and 3,435,092. These references, however, do not disclose the effect on the alkylate product quality of varying the direction of propagation of the reactant droplets with respect to the direction of flow of the catalyst phase. The present invention improves product quality by taking advantage of this effect.

OBJECTS AND EMBODIMENTS

It is an object of this invention to provide a method for producing an improved alkylation reaction product. Another object of this invention is to provide a novel alkylation apparatus for improved contact of reactants and catalyst in an acid-catalyzed alkylation process.

In one embodiment, my invention affords an acid-catalyzed alkylation reaction cooler which comprises in combination: (a) a horizontally-disposed, elongated chamber having internal heat removal means; (b) an acid inlet port at one end of said chamber and a reaction product outlet port at the opposite end of said chamber; (c) a plurality of reactant stream inlet ports disposed along said chamber between said acid inlet port and said reaction product outlet port; (d) a plurality of baffle means disposed in said chamber perpendicular to the longitudinal axis thereof; and, (e) a plurality of closed-end tubes, vertically disposed within said chamber, each of which communicates with said chamber through one of said reactant stream inlet ports; said reaction cooler further characterized in that each of said tubes has a multiplicity of spray nozzles.

BRIEF SUMMARY OF THE INVENTION

My invention involves a reaction cooler which provides improved contact between reactants and catalyst in an acid-catalyzed alkylation process. The reaction cooler may comprise a horizontally-disposed, elongated chamber having at one end an acid inlet and, at the other end, a reaction product outlet. The chamber has internally-placed heat exchange means for removal of heat of reaction, and disposed between the inlet and outlet are interposed pluralities of baffle means and reactant inlet means. These reactant inlet means are closed-end tubes having multiplicities of spray nozzles. Acid flows in serpentine fashion through the chamber and reactants are introduced into the acid stream from each of the inlet means through its nozzles. Each nozzle emits spray at directions perpendicular to or against the direction of flow of the catalyst in the vicinity of the nozzle. Improved product qualities are obtained by virtue of the relative directions of the catalyst and reactant flows at the point of contact within the reaction cooler.

BRIEF DESCRIPTION OF THE DRAWING

Preferred embodiments of my invention are described in the attached drawings. These drawings are not intended to unduly limit the scope of my claims but are presented as a guide to understanding the invention.

With reference now to FIG. 1, a reaction cooler is shown as a horizontally positioned, elongated, enclosed cylinder. Coolant enters end section 15 through conduit 2 and, being restrained by baffle 17, passes through heat exchange means 16 and exits end section 15 through conduit 3. Heat exchange means 16 are shown schematically and may comprise a plurality of tubes or coils disposed within the reaction chamber. A cooling medium such as water is introduced into conduit 2 at a rate sufficient to maintain a predetermined temperature within the reaction chamber. An acid catalyst phase enters reaction chamber 1 through conduit 9 and, being diverted by baffle means 10, passes in serpentine fashion through reaction chamber 1, exiting in conduit 8. Baffle means 10 are shown disposed within reaction chamber 1 in planes perpendicular to the longitudinal axis of the reaction chamber. The baffle means are substantially evenly spaced between catalyst inlet 9 and reaction product outlet 8, and have circular segment-shaped openings at alternate sides of reaction chamber 1 such that flow of the catalyst phase therein is diverted from side to side in the aforementioned serpentine fashion as shown in FIG. 2. Reactants in conduit 20 pass into conduits 4, 5, 6 and 7 from which they enter through reactant stream inlet ports 19 into closed-end tubes 11, 12, 13 and 14, respectively. Reactants are sprayed into the acid catalyst phase through spray nozzles 18 mounted in closed-end tubes 11, 12, 13 and 14, as shown in FIG. 3. Spray nozzles 18 produce fine dispersions of the reactants within the catalyst phase at directions throughout the azimuthal range indicated in FIG. 2. These directions are intended to be substantially perpendicular to or against the direction of flow of the catalyst phase within the reaction chamber. That is, approximately, through the range of 90° to 270° against the direction of flow of the catalyst phase in the vicinity of the spray nozzles. FIGS. 5 and 6 show this range as being all reactant spray directions lying between 90° and 270° proceeding in a counterclockwise direction from 90° to 270°. Thus, the direction of flow of the reactants is such that the components thereof are in directions perpendicular to and 180° against the direction of flow of said catalyst. As shown in FIG. 6 where vectors 21 denote direction of flow of catalyst and vectors 22 denote all possible reactant flow directions, the vectors lying between 90° and 270°, proceeding from 90° to 270° in a counterclockwise direction, would have components in the above stated direction of flow of reactants. Thereafter, reactants and reaction products are carried with the flow of the catalyst phase and exit the reaction chamber in conduit 8.

Figure 4:
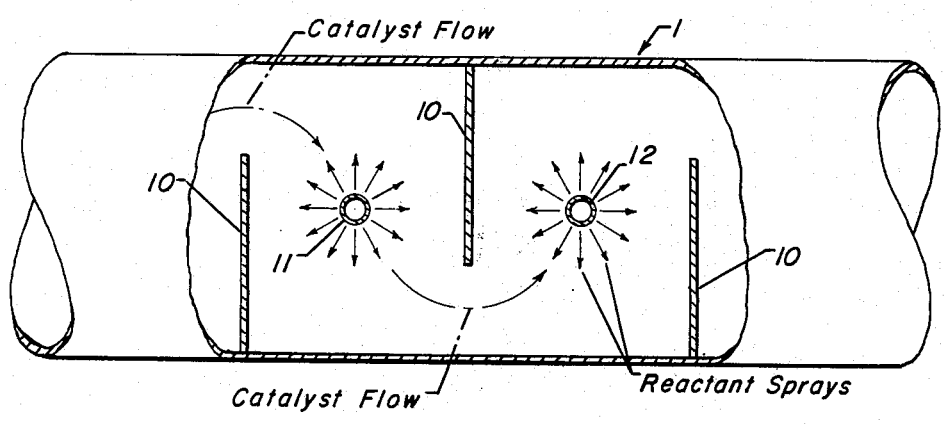
FIG. 4 is a sectional plan view of the reaction cooler, taken along the line 2—2 of FIG. 1, which shows the orientation of reactant sprays and catalyst flow in a second embodiment of this invention.
Figure 5:
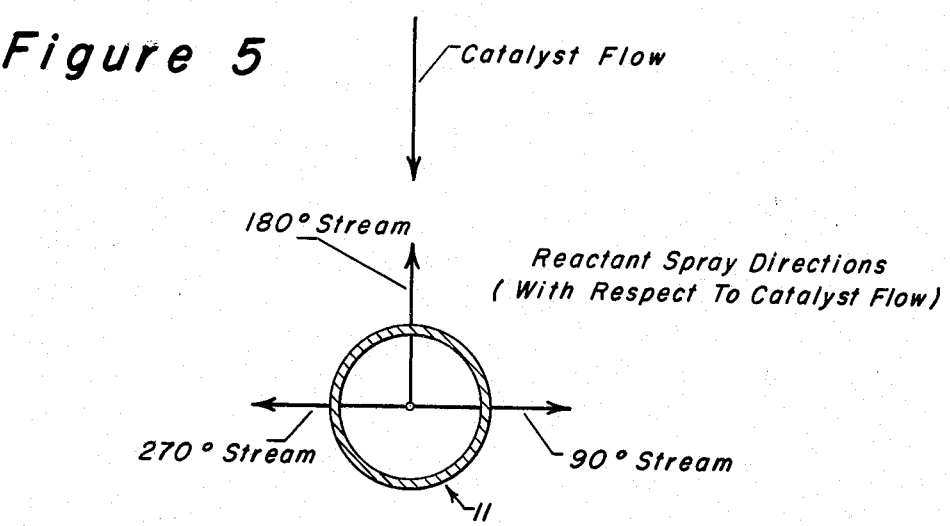
FIG. 5 is an enlarged view of the closed-end tube 11 of FIG. 2.
Figure 6:
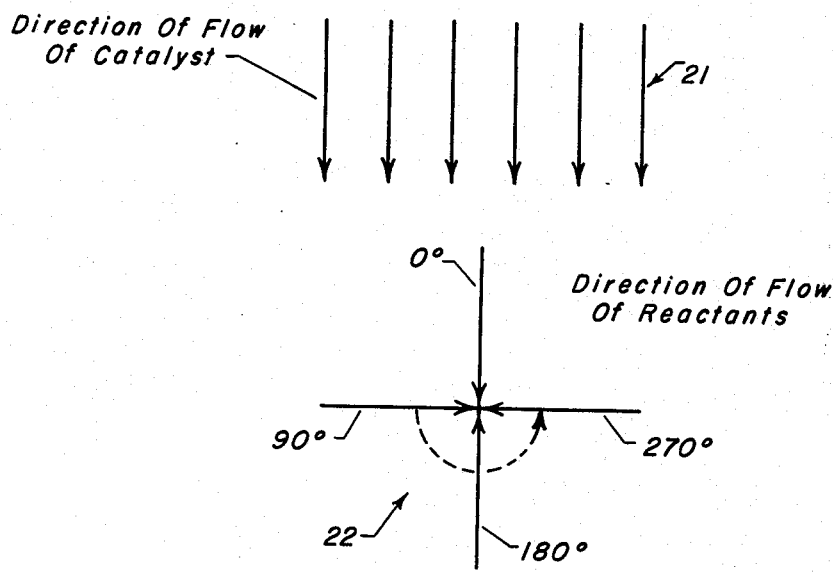
FIG. 6 is a vector diagram showing directions of flow for catalyst and reactants.

In another embodiment of my invention, as shown in FIG. 4, spray nozzles 18 are disposed to project spray in any azimuthal direction.

DETAILED DESCRIPTION OF THE INVENTION

In the alkylation processes suitable for the use of my invention reactants ideally combine to yield, as a principal product, a hydrocarbon of carbon content equal to the sum of the carbon atoms of the olefin and alkylatable reactants. A suitable alkylatable reactant may be a paraffinic hydrocarbon having a tertiary carbon atom such as isobutane or higher homologs of isobutane such as 2-methylbutane, 2-methylpentane, etc. Other useful alkylatable reactants include benzene, toluene, xylene, naphthenes, phenols, cresols, amines and the like.

The olefin reactants which may suitably be used in my invention include $C_3$–$C_{20}$ olefinic hydrocarbons, alkyl halides, alcohols, alkyl sulfates, alkyl phosphate, etc. Mono-olefins are preferable, such as propene and butenes.

Alkylation of the paraffinic reactant with the olefin is effected in the presence of an acid catalyst. Suitable catalysts include hydrogen halides, mineral acids such as phosphoric acid, Friedel-Crafts metal halides such as aluminum choride, boron fluoride, etc. A preferred hydrogen fluoride catalyst contains from 70 – 90 percent hydrogen fluoride with less than 2 percent water.

Alkylation reaction conditions to be maintained within the reaction cooler of the present invention include a temperature of from about 0°F to about 150°F and a pressure of from about 1 atmosphere to about 40 atmospheres. The reaction temperature is one of the more important variables as it has a significant influence on the quality of the alkylate product. A preferred range of temperature is from about 80°F to about 100°F. Pressure is not a significant variable with respect to product quality, provided that it is sufficient to keep all hydrocarbon and acid catalyst in the liquid state. The volumetric ratio of acid catalyst to hydrocarbon within the reaction cooler is maintained within the range of 1:1 to 2:1. At some point below 0.8:1 process efficiency decreases for many reasons, among which are occurrence of undesirable reactions and non-completion of desirable reactions. There appears to be no alkylate yield or quality improvement in increasing this ratio above 2:1. It is desirable to maintain a high ratio of the molar concentration of isoparaffin or aromatic present to the molar concentration of olefin present in order to produce high quality mono-alkylate. A broad range of this ratio is from about 6:1 to about 20:1 with a preferred operating range being from about 8:1 to about 16:1.

The essence of my invention involves the manner in which reactants are contacted with acid catalyst. I have discovered that there is a relationship between alkylate product quality and the relative directions of flow of reactants and acid catalysts at the point of their contact. This relationship was discovered in the operation of a pilot plant, producing motor fuel alkylate, whose reaction chamber contained a nozzle capable of introducing an olefin-isoparaffin mixture at different angles into a flowing acid catalyst stream. It was found, when the reactants were injected into the acid stream at directions perpendicular to or against the flow of acid, that the octane number of the resultant alkylate product was higher by about 0.7 research octane number than when the reactants were injected cocurrent with the acid. Data from the pilot plant are as follows:

| Injection Angle | 0° | 90° | 135° | 180° |
|---|---|---|---|---|
| Alkylate Octane Number, RON-clear | 96.1 | 96.8 | 96.9 | 96.8 |
| $C_9$+ in alkylate, wt.% | 7.6 | 7.5 | 6.9 | 5.0 |
| Contact time, Minutes | 6.9 | 6.8 | 6.9 | 6.8 |
| Reaction Chamber Temperature, °F. | 90 | 89 | 90 | 90 |
| Acid Strength, wt.% HF | 74 | 74 | 74 | 74 |
| Paraffin/Olefin Ratio, ($iC_4/C_4^=$) mole/mole | 12.1 | 11.8 | 12.3 | 11.7 |

The data show that the alkylate octane number was 96.1 when reactants were injected in the same direction as flow of acid catalyst within the pilot plant reactor. In other words, when the angle between the direction of flow of acid catalyst and the direction of flow of the reactants was 0°, the alkylate octane number was 96.1. When the direction of injection of reactants was changed to an angle of 90° with respect to the direction of acid flow, the alkylate octane number increased to 96.8 and remained at that level or higher as the angle was increased to 135° and later to 180°. An interesting facet of the data is that the content of alkylate with respect to heavy polymers ($C_9$+ in alkylate) decreased as the direction of reactants injection more opposed the direction of acid flow, reaching a minimum when the reactant flow was diametrically opposed to the flow of acid. As was mentioned, the ideal alkylation product contains carbon equal to the sum of the carbon contents of the reactants, in other words mono-alkylate. In the pilot plant case this is $C_4+C_4 = C_8$ or 8 carbon atoms per molecule. The $C_9$+ content of alkylate is indicative of the extent of polymerization taking place within the process. Less $C_9$+ indicates that less polymerization took place in the 180° orientation, and the resulting alkylate was purer in mono-alkylate. Hence, the quality of alkylate was improved in both octane number and purity of mono-alkylate.

Figure 1:
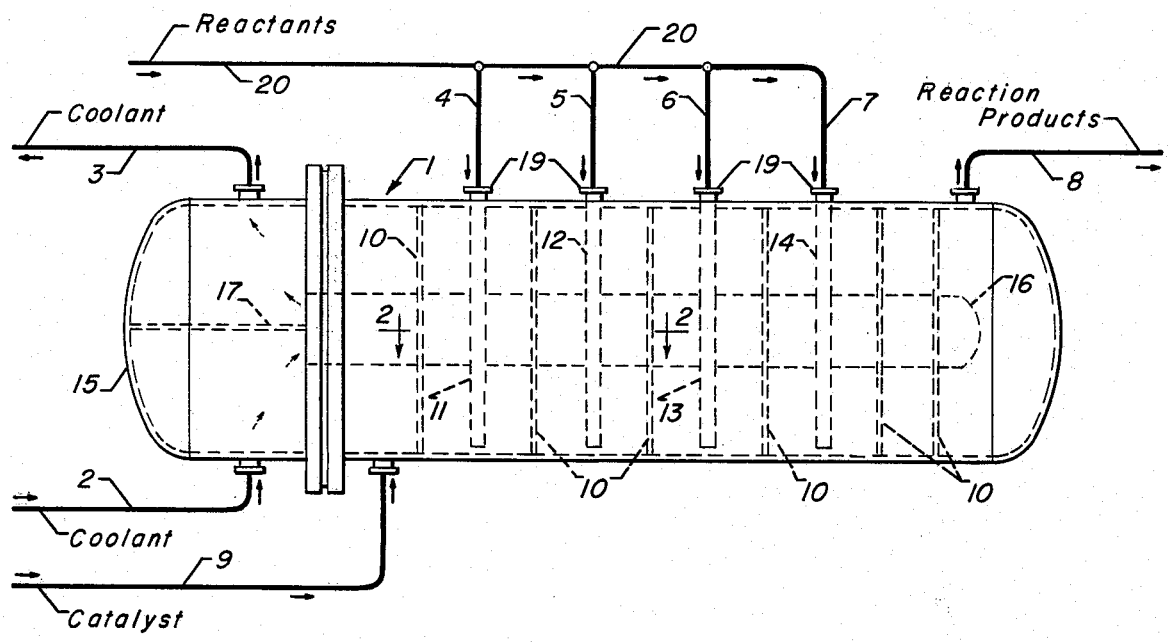
FIG. 1 is an elevation view of a reaction cooler consisting of reaction chamber 1 having end section 15.
Figure 2:
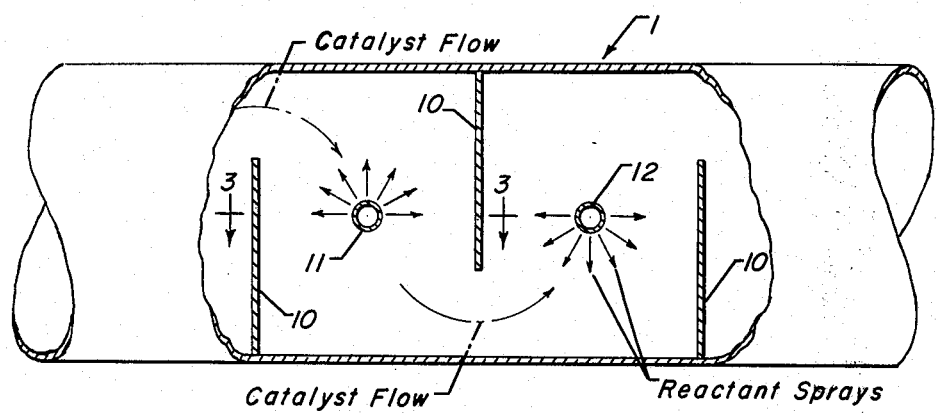
FIG. 2 constitutes a sectional plan view of the reaction cooler taken along the line 2—2 of FIG. 1, showing the orientations of reactant sprays and catalyst flow within the reaction cooler in one embodiment of the present invention.
Figure 3:
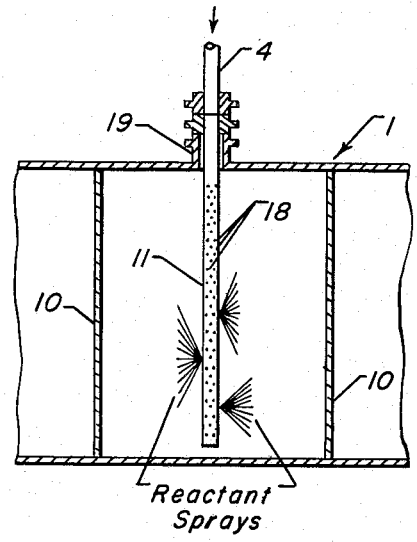
FIG. 3 is a sectional elevation view of the reaction cooler taken along the line 3—3 of FIG. 2, showing closed-end tube 18.

The reaction cooler of my invention effects an improvement in alkylate quality over prior art alkylation reaction devices through use of the above relation. In FIG. 1 and FIG. 2 an embodiment of the invention is shown in which baffle means 10 provide changes in direction of an acid catalyst as it flows from one end to another in horizontally disposed, elongated chamber 1. In one embodiment of the present invention these baffle means may be plates having a section removed at alternate sides of chamber 1. If chamber 1 is cylindrical in cross section then the baffle means are in the form of discs with circular segment-shaped openings at alternate sides. The baffle means are disposed within chamber 1 substantially evenly spaced and perpendicular to its longitudinal axis. A number of baffle means are installed which provides a pressure drop in chamber 1 of 5 to 25 psi. Interposed between baffle means 10 is a plurality of closed-end tubes 11, 12, 13, and 14, each of which has a multiplicity of spray nozzles 18. Sprays propagate in directions perpendicular to or against the flow of catalyst within chamber 1 in the vicinity of closed-end tubes 11, 12, 13 and 14. In preferred embodiments of this invention the number of closed-end tubes is from 2 to 6. The closed-end tubes communicate with reactant conduits 4, 5, 6 and 7 through reactant stream inlet ports 19, as shown in FIGS. 1 and 3. Reaction chamber 1 has end section 15 which contains means 17 for diverting coolant flow into heat exchange means 16 placed within chamber 1. In a preferred embodiment, the heat exchange means comprise a tube bundle. End section 15 also has coolant inlet 2 and coolant outlet 3. Chamber 1 is provided with catalyst inlet 9 and reaction products outlet 8.

In operation, catalyst enters reaction cooler 1 through conduit 9, passes in a serpentine path around baffles 10 and closed-end tubes 11, 12, 13 and 14 and exits reaction chamber 1 in conduit 8. In the vicinity of closed-end tubes 11, 12, 13 and 14 reactants are sprayed into the catalyst in accordance with my aforementioned example such that alkylate of improved product quality is produced. The catalyst, reactants and reaction products in conduit 8 proceed to downstream processing steps where the alkylate product is recovered. The heat of reaction generated within the reaction cooler is withdrawn by heat exchange means 16 to maintain predetermined temperature conditions. It is also within the scope of this invention to employ closed-end tubes with spray nozzles disposed to propagate sprays at all directions around the closed-end tubes as shown in FIG. 4. This embodiment is particularly useful in cases where overall size of the reaction cooler is a governing consideration, because use of more spray nozzles per closed-end tube can result in a smaller reaction cooler or in more capacity in a given reaction cooler.

Reasonable variation and modification are possible within the scope of the foregoing disclosure, the drawings, and the claims to the invention without departing from the spirit thereof.

I claim as my invention:

1. An acid-catalyzed alkylation reaction cooler which comprises, in combination:
   a. a horizontally-disposed, elongated chamber having internal heat removal means;
   b. a catalyst inlet port at one end of said chamber and a reaction product outlet port at the opposite end of said chamber;
   c. a plurality of reactant stream inlet ports disposed along said chamber between said catalyst inlet port and said reaction product outlet port;
   d. a plurality of baffle means disposed in said chamber perpendicular to the longitudinal axis thereof, said baffle means having circular segment-shaped openings at alternate sides of said reaction chamber to thereby direct catalyst flow from side to side in serpentine fashion;
   e. a plurality of closed-end tubes, vertically disposed within said chamber, each of which communicates with said chamber through one of said reactant stream inlet ports; and
   f. each of said tubes having a multiplicity of spray nozzles, said spray nozzles being provided with means to project spray at directions having components perpendicular to and 180° against the direction of flow of said catalyst in the vicinity of said spray nozzles.

2. The reaction cooler of claim 1 further characterized in that said plurality of closed-end tubes includes 2 to 6 tubes, each tube separated from the adjacent tube by one or more of said baffle means.

3. The combination of claim 1 further characterized in that said baffle means are substantially evenly spaced between said acid inlet port and said product outlet port.

4. The reaction cooler of claim 1 further characterized in that said baffle means are installed in number sufficient to furnish a pressure drop of 5 to 25 psi.

* * * * *